Feb. 19, 1946.          G. E. DATH           2,395,171
                  FRICTION SHOCK ABSORBER
                    Filed April 8, 1944
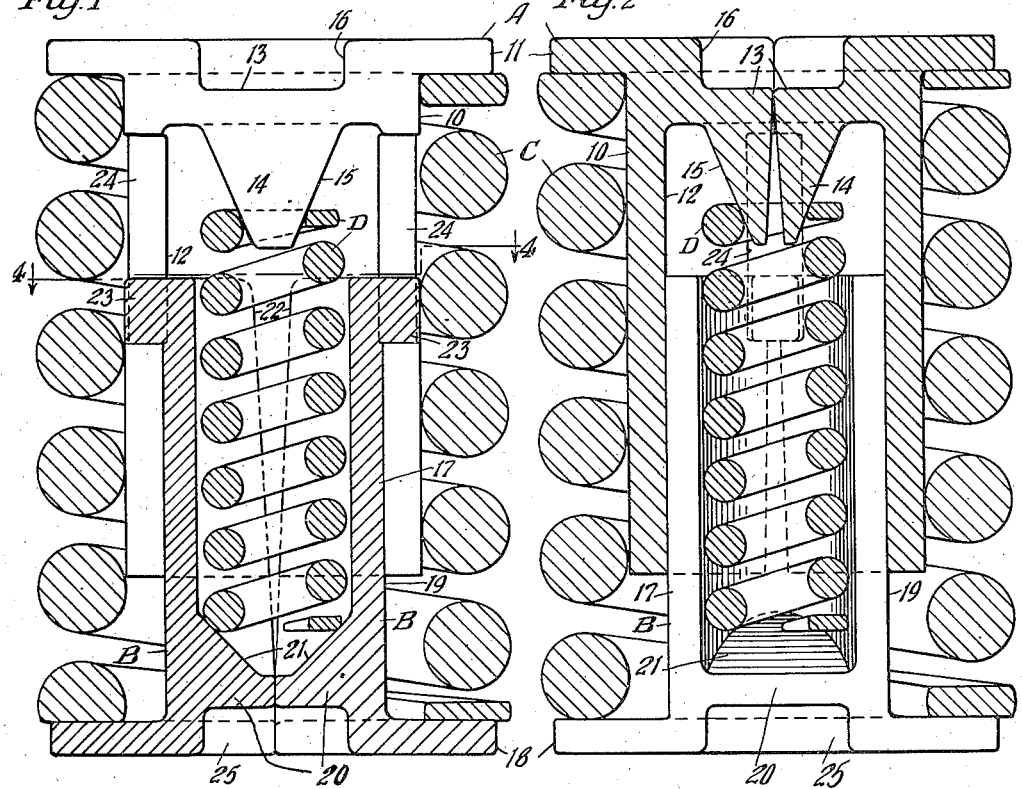
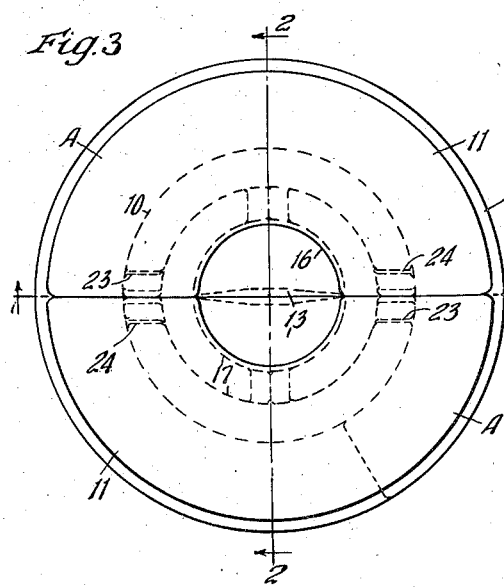
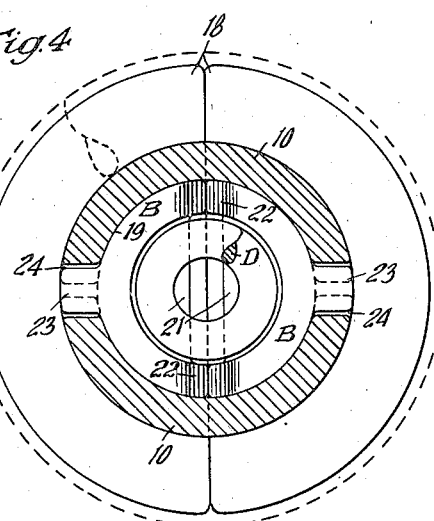
Inventor
George E. Dath
By Henry Fuchs,
Atty.

Patented Feb. 19, 1946

2,395,171

UNITED STATES PATENT OFFICE 2,395,171

FRICTION SHOCK ABSORBER

George E. Dath, Chicago, Ill., assignor to W. H. Miner, Inc., Chicago, Ill., a corporation of Delaware Application April 8, 1944, Serial No. 530,112

15 Claims. (Cl. 267—9)

This invention relates to improvements in friction shock absorbers, especially adapted for use with springs of railway car trucks for snubbing or dampening the action of said springs.

One object of the invention is to provide a simple and efficient friction shock absorber for dampening the action of truck springs of a railway car, comprising a pair of friction members at one end of the mechanism forming, in effect, a longitudinally divided, split friction casing; a pair of friction members at the other end of the mechanism forming, in effect, a longitudinally divided, split friction casing which is telescoped over the casing formed by the first named members; an outer spring surrounding the casings and opposing relative lengthwise movement thereof; and an inner coil spring within the casings having wedging engagement at opposite ends with the members forming said casings to expand the inner casing and contract the outer casing to place the friction surfaces thereof in tight frictional contact with each other.

A further object of the invention is to provide a shock absorber as set forth in the preceding paragraph, wherein the wedging engagement between the inner coil spring is provided by interior wedge faces on the members forming the inner casing, exteriorly engaging said coil spring at one end thereof, and by wedge projections on the members forming the outer casing, interiorly engaging said coil spring at the other end thereof.

Other objects of the invention will more clearly appear from the description and claims hereinafter following.

In the drawing forming a part of this specification, Figure 1 is a transverse vertical sectional view of my improved shock absorber, corresponding substantially to the line 1—1 of Figure 3. Figure 2 is a transverse vertical sectional view, corresponding substantially to the line 2—2 of Figure 3. Figure 3 is a top plan view of Figure 1. Figure 4 is a horizontal sectional view, corresponding substantially to the line 4—4 of Figure 1.

My improved friction shock absorber comprises broadly a pair of upper friction members A—A together forming a vertically split outer casing; a pair of lower friction members B—B forming a vertically split inner casing telescoped between the members A—A; an outer spring C; and an inner spring D.

The outer friction members A—A, which are at the upper end of the mechanism, are of similar design, and together form a vertically split casing. Each friction member A comprises a transversely curved, wall or section 10, which extends vertically. The wall or section 10 is provided with a horizontally disposed, outwardly projecting, arcuate flange 11, which forms a follower member. The flanges of the members A—A are disposed at the upper ends of the transversely curved, sections 10—10. The section 10 of each member A is provided with a longitudinally extending, transversely curved, inner friction surface 12. On the inner side, each member A is provided with a horizontally disposed, laterally inwardly extending web or wall 13, which is offset downwardly from the upper end of the member A. The web or wall 13 is provided with a depending wedge projection 14, which is downwardly tapered, as clearly shown in Figure 2. The wedge projections 14—14 of the two members A—A together form a vertically split wedge, which is formed partly on each member forming the upper casing. The wedge projections 14—14 diverge slightly in downward direction, as clearly seen in Figure 2, and together present an exterior, conical wedge face 15. The downwardly offset web or wall 13 of each friction member A provides an opening or recess 16 in said member, which faces upwardly and forms one-half of a spring seat which is adapted to receive the usual spring centering projection on the upper spring follower plate of the truck spring cluster of a railway car.

The friction members B—B, which are at the lower end of the mechanism, are of similar design, and together form the lower split casing. Each member B comprises a transversely curved, longitudinally extending, wall or section 17, having an outwardly extending, horizontal flange 18 at its lower end, which is of arcuate shape and forms a follower member. On the outer side, the section 17 of each member B presents a longitudinally extending, transversely curved friction surface 19, adapted to cooperate with the friction surface 12 of the corresponding upper friction member A. At the lower end, each member B has an inwardly projecting web or wall 20 which merges with the inner side of the wall or section 17, thereby forming a thickened portion. This thickened portion is provided with a flat wedge face 21, which is inclined downwardly and toward the central axis of the mechanism. The wedge faces 21—21 of the two members B—B are opposed and face upwardly. The side edges 22 of the walls 17—17 of the members B—B are cut away, being inclined toward the central axis of the mechanism in downward direction. At the upper end thereof, the wall or section 17 of each member B has a laterally outwardly projecting retaining lug 23 centrally thereof, which serves to anchor the member B to the corresponding upper member A to limit separation of these members, as hereinafter pointed out.

In the assembled condition of the device, the friction members B—B form a vertically split casing, which casing is telescoped within the upper casing formed by the members A—A.

The lugs 23—23 of the members B—B extend into vertical guide slots 24—24 in the walls or sections 10—10 of the members A—A. As will be evident, the lug and slot connection between the members B—B and A—A holds the parts assembled, limiting lengthwise separation of the upper and lower casings, and prevents relative rotary displacement of the friction members about the central vertical axis of the mechanism, outward movement of the lugs 23—23 being limited by engagement of these lugs with the lower end walls of the slots 24—24, and rotary movement being prevented by engagement of the lugs with the side walls of the slots. Slight clearance is provided between the lugs 23—23 and the side walls of the slots 24—24 to permit the required contraction of the members forming the upper casing.

As shown in Figure 4, clearance is also provided between the opposed edges of the two members A—A to permit contraction of the upper casing.

Each member B is provided with a downwardly opening recess 25 which forms a part of a seat to receive the spring centering projection of the bottom spring follower plate of the truck spring cluster, the recesses 25—25 of the members together forming a complete seat for this purpose.

The diverging relation of the edge portions 22—22 of the walls or sections 17—17 of the members B—B permits the required amount of tilting necessary in assembling the upper and lower casings and engaging the lugs 23—23 within the slots 24—24.

In the assembled condition of the parts of the shock absorber, each friction member A laterally overlaps both of the friction members B—B, that is, the members A—A are so disposed that the vertical plane along which the lower split casing, formed by the members B—B, is divided, vertically bisects the friction members A—A.

The outer spring C, which is in the form of a heavy coil, surrounds the upper and lower casings and has its top and bottom ends bearing respectively on the flanges 11—11 of the friction members A—A and the follower flanges 18—18 of the friction members B—B, and yieldingly resists relative approach of the upper and lower friction members. The spring C is preferably under initial compression in the assembled condition of the shock absorber.

The inner spring D is in the form of a vertically disposed coil which has wedging engagement at its lower end directly with the wedge faces 21—21 of the members B—B and engages about the wedge projections 14—14 of the members A—A, at its upper end, and has direct wedging engagement with the conical wedge face 15 of said projections. The spring D is preferably also under initial compression to maintain the friction surfaces of the members A—A and B—B in tight frictional contact, the wedging action of the spring forcing the members B—B apart and contracting the upper casing composed of the members A—A.

My improved shock absorber or snubber is substituted for one or more of the spring units of a truck spring cluster, being interposed between the top and bottom spring plates of said cluster.

The operation of my improved shock absorber is as follows: Upon the cluster of springs of a railway car truck being compressed between the upper and lower spring follower plates of the truck springs, the upper casing formed by the members A—A is moved downwardly with respect to the lower casing formed by the members B—B, against the resistance of both springs C and D. High frictional resistance is thus produced, which increases as compression of the mechanism progresses to snub the action of the truck springs. The frictional resistance during compression increases progressively due to the increased pressure exerted by the spring D as the latter is being compressed.

Upon the spring follower plates of the spring cluster being moved apart, during recoil of the truck spring, expansive action of the springs C and D restores the parts to the normal position shown in Figure 1, separation of the members A—A and B—B being positively limited by the lugs 23—23 of the members B—B engaging the lower end walls of the slots 24—24 of the members A—A.

I have herein shown and described what I now consider the preferred manner of carrying out my invention, but the same is merely illustrative and I contemplate all changes and modifications that come within the scope of the claims appended hereto.

I claim:

1. In a friction shock absorber, the combination with a split friction casing; of a second split friction casing slidingly telescoped within said first named casing; and a coil spring within said casings having direct wedging engagement therewith to contract said first named casing and expand said second named casing, said spring opposing relative movement of said casings toward each other in lengthwise direction.

2. In a friction shock absorber, the combination with a longitudinally split casing comprising a pair of friction members; of a second longitudinally split casing comprising a pair of friction members slidingly telescoped within said first named casing; a coil spring within said casings disposed lengthwise thereof and having wedging engagement therewith to contract said first named casing and expand said second named casing against said first named casing; and spring means opposing relative lengthwise movement of said casings toward each other.

3. In a friction shock absorber, the combination with a longitudinally split casing comprising a pair of friction members; of an inwardly projecting split wedge projection at the inner end of the casing, formed partly on each of said friction members; a second longitudinally split casing comprising a pair of friction members slidingly telescoped within said first named casing, said last named pair of friction members having opposed, interior wedge faces; and a coil spring within said casings disposed lengthwise thereof and having wedging engagement at opposite ends with said wedge projection and wedge faces to contract said first named casing and expand said second named casing against said first named casing.

4. In a friction shock absorber, the combination with a longitudinally split casing comprising a pair of friction members; of an inwardly projecting split wedge projection at the inner end of the casing, formed partly on each of said friction members; a second longitudinally split casing comprising a pair of friction members slidingly telescoped within said first named casing, said last named pair of friction members having opposed, interior wedge faces; a coil spring within said casings disposed lengthwise thereof and having wedging engagement at opposite ends with said wedge projection and wedge faces to contract said first named casing and expand said second named casing against said first named casing; and spring means opposing relative lengthwise movement of said casings toward each other.

5. In a friction shock absorber, the combination with a split, cylindrical friction casing; of a second split, cylindrical friction casing slidingly telescoped within said first named casing; and a coil spring within said casings having direct wedging engagement therewith to contract said first named casing and expand said second named casing, said spring opposing relative movement of said casings toward each other in lengthwise direction.

6. In a friction shock absorber, the combination with a longitudinally split, cylindrical casing comprising a pair of friction members; of a second longitudinally split, cylindrical casing comprising a pair of friction members slidingly telescoped within said first named casing; a coil spring within said casings disposed lengthwise thereof and having wedging engagement therewith to contract said first named casing and expand said second named casing against said first named casing; and spring means opposing relative lengthwise movement of said casings toward each other.

7. In a friction shock absorber, the combination with a longitudinally split, cylindrical casing comprising a pair of friction members; of an inwardly projecting split wedge projection at the inner end of the casing, formed partly on each of said friction members; a second longitudinally split, cylindrical casing comprising a pair of friction members slidingly telescoped within said first named casing, said last named pair of friction members having opposed, interior wedge faces; and a coil spring within said casings disposed lengthwise thereof and having wedging engagement at opposite ends with said wedge projection and wedge faces to contract said first named casing and expand said second named casing against said first named casing.

8. In a friction shock absorber, the combination with a pair of friction members at one end of the mechanism having longitudinally extending friction surfaces on their outer sides; of wedge faces on the inner sides of said members at the outer ends thereof; a second pair of friction members at the other end of the mechanism having longitudinally extending friction surfaces on their inner sides, said second named friction members embracing said first named members with the friction surfaces thereof slidingly engaged with the friction surfaces of said first named members; tapered inward projections on said second named members, said projections being tapered inwardly of the mechanism and together forming a split wedge member; and a coil spring embraced between said first named members and extending lengthwise of the mechanism, said spring at one end engaging over said split wedge member in wedging engagement therewith and having wedging engagement at the other end with the wedge faces of said first named pair of members.

9. In a friction shock absorber, the combination with a pair of longitudinally extending friction members at one end of the mechanism, said members having laterally inwardly extending base flanges provided with tapered, inwardly projecting, portions forming an inwardly tapered, split wedge member; of a second pair of longitudinally extending friction members at the other end of the mechanism, said second named members being slidingly telescoped between said first pair of members in frictional contact therewith, said second named members having laterally inwardly extending base flanges provided with inwardly diverging wedge faces at the inner sides of said members; and a longitudinally extending coil spring between said second named members, bearing at one end on said wedge faces in direct wedging engagement therewith, and having the other end thereof engaged over said inwardly tapered projections of said first named members in wedging engagement therewith.

10. In a friction shock absorber, the combination with a pair of longitudinally extending, transversely curved friction members at one end of the mechanism having longitudinally extending, transversely curved friction surfaces on the inner sides thereof; of a laterally inwardly extending flange at the outer end of each of said members; a tapered wedge projection extending from the flange of each of said members, the wedge projections diverging inwardly of the mechanism and having inwardly converging, exterior wedge faces, said wedge projections together forming an inwardly tapered wedge member; a second pair of longitudinally extending, transversely curved friction members at the other end of the mechanism, slidingly telescoped between said first named pair of members and having longitudinally extending, transversely curved, exterior friction surfaces engaging the interior friction surfaces of said first named pair of members; opposed, interior, inwardly diverging wedge faces at the outer ends of said second named members; and a coil spring embraced between said second named members and bearing at one end on the wedge faces of said second named members in direct wedging engagement therewith, and having the other end thereof engaged over said tapered wedge projections of said first named pair of members in direct wedging engagement with the wedge faces thereof.

11. In a friction shock absorber, the combination with a pair of longitudinally extending friction member at one end of the mechanism, said members having laterally inwardly extending base flanges provided with tapered, inwardly projecting portions forming an inwardly tapered split wedge member; of laterally outwardly extending follower flanges at the outer ends of said members; a second pair of longitudinally extending friction members at the other end of the mechanism, said second named members being slidingly telescoped between said first pair of members in frictional contact therewith, said second named members having laterally inwardly extending base flanges provided with inwardly diverging wedge faces at the inner sides of said members; laterally outwardly extending follower flanges at the outer ends of said second named members; a longitudinally extending coil spring between said second named members, bearing at one end on said wedge faces in direct wedging engagement therewith, and having the other end thereof engaged over said inwardly tapered projections of said first named members in wedging engagement therewith; and spring means surrounding said first and second named pairs of members and bearing at opposite ends on the follower flanges of said pairs, respectively.

12. In a friction shock absorber, the combination with a pair of longitudinally extending, transversely curved friction members at one end of the mechanism having longitudinally extending, transversely curved friction surfaces on the inner sides thereof; of a laterally inwardly extending flange at the outer end of each of said members; a laterally outwardly projecting follower flange at the outer end of each member; a tapered wedge projection extending from the flange of each of said members, the wedge projections diverging inwardly of the mechanism and having inwardly converging, exterior wedge faces, said wedge projections together forming an inwardly tapered wedge member; a second pair of longitudinally extending, transversely curved friction members at the other end of the mechanism, slidingly telescoped between said first named pair of members and having longitudinally extending, transversely curved, exterior friction surfaces engaging the interior friction surfaces of said first named pair of members; opposed, interior, inwardly diverging wedge faces at the outer ends of said second named members; laterally outwardly projecting follower flanges at the outer ends of said members of the second named pair; a coil spring embraced between said second named members and bearing at one end on the wedge faces of said second named members in direct wedging engagement therewith, and having the other end thereof engaged over said tapered wedge projections of said first named pair of members in direct wedging engagement with the wedge faces thereof; and spring means surrounding said first and second named pairs of members and bearing at opposite ends on the follower flanges of said pairs, respectively.

13. In a friction shock absorber, the combination with a longitudinally split, cylindrical friction casing comprising a pair of transversely curved friction members; of a second longitudinally split, cylindrical friction casing comprising a pair of transversely curved friction members slidingly telescoped within said first named casing; an interior, inwardly tapered, central wedge projection on said first named casing formed partly on each member thereof; opposed, interior wedge faces at the outer end of the second named casing; and a coil spring within said casings disposed lengthwise thereof and having one end thereof engaged over said tapered wedge projection of the members forming said first named casing, and the other end bearing on the opposed wedge faces of the members of the second named casing.

14. In a friction shock absorber, the combination with a longitudinally split, cylindrical friction casing comprising a pair of transversely curved friction members; of a second longitudinally split, cylindrical friction casing comprising a pair of transversely curved friction members slidingly telescoped within said first named casing, each of the members of said first named pair being laterally overlapped by both members of the second named pair; an interior, inwardly tapered, central wedge projection on said first named casing formed partly on each member thereof; opposed, interior wedge faces at the outer end of the second named casing; and a coil spring within said casings disposed lengthwise thereof and having one end thereof engaged over said tapered wedge projection of the members forming said first named casing, and the other end bearing on the opposed wedge faces of the members of the second named casing.

15. In a friction shock absorber, the combination with a longitudinally split, cylindrical friction casing comprising a pair of transversely curved friction members; of a second longitudinally split, cylindrical friction casing comprising a pair of transversely curved friction members slidingly telescoped within said first named casing, each of said members of said first named pair being laterally overlapped by both of said members of the second named pair; interengaging lugs and slots on the members of said first and second named pairs for limiting lengthwise separation of said first and second named casings with respect to each other; an interior, inwardly tapered, central wedge projection on said first named casing formed partly on each member thereof; opposed, interior wedge faces at the outer end of the second named casing; and a coil spring within said casings disposed lengthwise thereof and having one end thereof engaged over said tapered wedge projection of the members forming said first named casing, and the other end bearing on the opposed wedge faces of the members of the second named casing.

GEORGE E. DATH.